United States Patent Office 3,663,434
Patented May 16, 1972

3,663,434
DESULFURIZATION
Alan G. Bridge, El Cerrito, Calif., assignor to Chevron Research Company, San Francisco, Calif.
Continuation-in-part of application Ser. No. 743,568, July 9,1968, which is a continuation-in-part of application Ser. No. 688,046, Sept. 15, 1967. This application Jan. 12, 1970, Ser. No. 2,097
The portion of the term of the patent subsequent to Feb. 17, 1987, has been disclaimed
Int. Cl. C10g 23/02
U.S. Cl. 208—210
8 Claims

ABSTRACT OF THE DISCLOSURE

A process for hydrodesulfurization of a heavy oil containing iron as an organometallic compound, which comprises: (a) passing the heavy oil at an elevated temperature, together with hydrogen, through a first fixed catalyst bed which has increasing catalytic hydrogenation activity along the normal direction of feed flow through the first bed; and (b) passing at least a portion of the effluent from the first bed, at an elevated temperature and pressure, and in the presence of hydrogen, through a second fixed bed containing sulfactive catalyst particles having a surface are of at least 100 m.$^2$/g.

CROSS REFERENCES TO RELATED APPLICATIONS

This application is a continuation-in-part of my application Ser. No. 743,568, now U.S. Pat. No. 3,496,099 filed July 9, 1968, which is continuation-in-part of Ser. No. 668,046 filed Sept. 15, 1967. My application Ser. No. 2,096 titled Multi-Stage Desulfurization, filed on Jan. 12, 1970, is also closely related to the present application. The two aforesaid parent applications and my closely related application titled Multi-Stage Desulfurization are incorporated by reference into the present patent application.

BACKGROUND OF THE INVENTION

The present invention relates to hydrodesulfurization of hydrocarbons. More particularly, the present invention relates to multistage hydrodesulfurization of heavy oils contaminated with organometallic compounds.

A number of processes have been proposed for hydrodesulfurization of hydrocarbons and a large measure of success has been achieved in the hydrodesulfurization of relatively light oils. Heavier oils, especially residual oils, are more difficult to hydrodesulfurize. One of the more important reasons why heavy oils are relatively difficult to desulfurize is the frequent relatively high organometallic contaminant content present in heavy oils as compared to lighter oils. Organometallic compounds present in the heavy oils above concentrations of about 1 to 3 p.p.m., calculated as the metal by weight, cause relatively rapid deactivation of hydrodesulfurization catalysts, as these metals tend to deposit on the surface of the catalysts. Also, the metals present in the oil as soluble organometallic compounds tend to deposit out in the interstitial volume between catalyst particles contained in a fixed catalyst bed and therefore cause plugging porblems; that is, high pressure drop problems.

The more common of the metallic contaminants are iron, vanadium and nickel, often existing in concentrations in excess of 50 p.p.m. Other metals, including sodium, copper, etc., may also be present. These metals may exist within the hydrocarbon distillate and residuum fractions in a variety of forms; they may exist as metal oxides or as sulfides introduced therein as a form of metallic scale; they may be present in the form of soluble salts of such metals; usually, however, they are present in the form of high molecular weight organometallic compounds, including metal porphyrins, metal naphthenates, and the various derivatives of the porphyrins and naphthenates.

The forms the soluble metallic compounds may assume in oils, particularly residual oils, are not known with certainty. One general form for a metallic porphyrin may be represented as follows for iron:

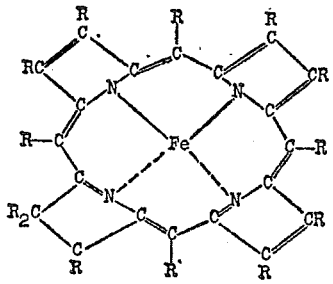

Another type of soluble organometallic compounds found in oils, particularly residual oils, are the metal naphthenates. One general form for the metal naphthenates may be represented as follows for iron:

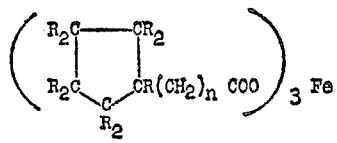

where $n$ may be zero but generally is an integer between 1 and 5, and R is hydrogen or an alkyl group.

Although metallic contaminants, existing as oxide or sulfide scale, may be removed, at least in part by a relatively simple filtering technique, and the water soluble salts are at least in part removable by washing and a subsequent dehydration procedure, a much more severe treatment is required to effect the destructive removal of the organometallic compounds, particularly to the degree which is necessary to produce a heavy hydrocarbon fraction suitable for further processing.

Various processes have been proposed for the hydrodesulfurization of heavy oils which are contaminated with organometallic compounds. For example, U.S. Pat. 2,771,401 is directed to a crude oil hydrodesulfurization process wherein spent silica-alumina cracking catalyst is used ahead of cobalt-molybdenum catalyst in a second zone. Thus, according to a process of U.S. Pat. 2,771,401, a feed stock to be desulfurized is passed into a first catalytic zone at a temperature within the range of 700° to 850° F. and containing a highly adsorptive material possessing some catalytic properties for hydrodesulfurization for petroleum hydrocarbons. The effluent from the first catalytic zone is then passed to a second catalytic zone where it is contacted with sulfactive catalyst to reduce its sulfur content by at least 50% and usually to an amount less than about .1%. A desulfurized petroleum fraction is recovered as product from the second catalytic zone.

U.S. Pat. 3,180,820 also is directed to a two-stage heavy oil hydrodesulfurization process. According to U.S. Pat. 3,180,820, a heavy hydrocarbon oil containing metallic and sulfurous contaminants is desulfurized by passing the heavy oil and hydrogen at elevated pressure through a first hydrorefining zone containing a solid hydrogenation catalyst and maintained at a temperature in the range of about 700–850° F. to convert asphaltenes and metallic contaminants, and then passing at least the higher boiling fraction of the hydrocarbonaceous effluent containing sulfurous contaminants from said first zone together with hydrogen at elevated pressure through a second hydrorefining zone containing a solid hydrogenation catalyst and maintained at substantially the same temperature as said first zone to remove the sulfur contaminants.

Although various multistage processes have been proposed for hydrodesulfurization of heavy oils, these previously proposed processes have not adequately coped with the metals plugging problem of the first stage catalyst bed when the first stage is a fixed catalyst bed. U.S. Pat. 3,180,820, for example, states that a fluidized bed is preferred in the two-stage desulfurization process discussed in that patent. However, a fluidized bed is not as efficient as a fixed catalyst bed and fluidized beds have certain mechanical operating problems which fixed catalyst beds do not. Accordingly, it would be desirable to use a fixed catalyst bed for the first stage if the metals plugging problem could be coped with.

SUMMARY OF THE INVENTION

According to the present invention, a process is provided for hydrodesulfurization of a heavy oil containing iron as an organometallic compound, which process comprises (a) passing the heavy oil, together with hydrogen, at elevated temperatures through a first fixed catalyst bed which has increasing catalytic hydrogenation activity along the normal direction of feed flow through the first bed; and (b) passing at least a portion of the effluent from the first bed, at elevated temperatures and pressure, and in the presence of hydrogen, through a second fixed bed containing sulfactive catalyst particles having a surface area of at least 100 m.$^2$/g.

The present invention is based upon several findings. In laboratory hydrodesulfurization test runs, it has been found that highly active hydrodesulfurization catalyst deactivates, or fouls out, relatively rapidly when there is no metals removal or catalyst contacting operation applied to the metals-contaminated heavy oil feed prior to hydrodesulfurization of the heavy oil using the fixed bed. It has been determined that the use of a catalyst bed comprising macropored catalyst to hydrotreat the heavy oil, prior to passing the heavy oil to the highly active hydrodesulfurization catalyst bed, results in a surprisingly high degree of sulfur removal over extended periods of time using even less total catalyst than when only the highly active hydrodesulfurization catalyst is used. However, it was also determined that the first fixed catalyst bed, which contains the macropored catalyst and which serves to remove substantial quantities of metals from the heavy oil feed, tends to plug relatively rapidly. This plugging of the first fixed catalyst bed tends to make the process economically unattractive because of power loss due to pressure drop and other operating difficulties resulting from considerably increased pressure drop across the first fixed catalyst bed. However, in accordance with the present invention, this problem is coped with by using a tailored catalyst bed in the first fixed catalyst bed. The tailored catalyst bed is described in some detail in my copending patent application, Ser. No. 743,568, now U.S. Pat. No. 3,496,099 filed July 9, 1968, which patent specification is incorporated by reference into the present patent specification.

In the present invention, the feed is usually a heavy oil fraction, a substantial part of which boils above 900° F. The feed typically contains at least 1 p.p.m. metals and generally more than 4 p.p.m. metals, such as calcium, arsenic, sodium, iron, vanadium, and nickel. The present invention is particularly advantageously applied to hydrocarbon feedstocks containing one or more parts per million by weight of iron as oil soluble iron compounds.

The heavy oil fraction is passed through the first-stage fixed catalyst bed, preferably at a temperature between 400°–900° F., and more preferably between 600°–850° F., preferably a pressure between 200 p.s.i.g. and 5000 p.s.i.g., and more preferably between 500 p.s.i.g. and 2000 p.s.i.g. Because the present invention avoids formation of a high pressure drop plug due to metals deposited at the top of the bed, very high metals content feeds may be processsed, such as resins containing several hundred parts per million metals.

It has been found that iron deposits preferentially in the interstices, i.e., void volume, between the catalyst particles, particularly at the top of the hydrogenation catalyst bed, whereas vanadium and nickel deposit preferentially within the catalyst pores, i.e., inside the catalyst particles. In spite of this, surprisingly it has been found that not only metals from organometallic compounds of the class vanadium and nickel are distributed approximately uniformly throughout the bed when the fixed catalyst is tailored in accordance with the present invention, but also that iron deposits approximately uniformly throughout the tailored bed. Using the tailored catalyst bed, the iron does not form a high pressure drop plug across the entrance cross section of the catalyst bed after only a short period of on-stream time as is the case with fixed beds used heretofore in hydroconverson of iron-contaminated oils. In this patent application, the term "plug" is used to connote a substantial increase, generally at least an increase of 50%, in the pressure drop across the bed versus what the pressure drop was across the bed before the metals-containing feed was passed through the bed. Because of the increased pressure drop, fluid flow is substantially hindered.

The heavy oil used in the process of the present invention may be a residual oil selected, for example. from the group consisting of reduced crude, vacuum distillation residuum, solvent deasphalted reduced crude, solvent deasphalted vacuum residuum and mixtures thereof.

According to a preferred embodiment of the present invention, the first catalyst bed is tailored with respect to both (a) interstitial void volume between the particles by varying the size or configuration (i.e., shape) of the particles in the bed so as to provide decreasing interstitial voidage through the bed along the normal direction of feed flow, and (b) catalytic activity for effecting hydrogenation reactions so as to provide increasing catalytic hydrogenation activity through the bed along the normal direction of feed flow.

Since it has been found that iron deposits in the interstices between the catalyst particles and further found that the amount deposited can be controlled by the amount of active hydrogenation catalyst of a given size per unit volume of interstitial void volume, as indicated above, a particularly preferred embodiment of the present invention is to tailor or grade the catalyst bed so as to provide a decreasing amount of interstitial void volume down the bed in the direction of oil flow. Thus, the bed is tailored so as to provide more interstitial volume for iron deposits at the top of the bed than at the lower part of the bed. In this embodiment of the invention, hydrogenation catalysts of the same composition may be used throughout the bed; but the particle size or configuration (i.e., shape) of the catalyst is varied from top to bottom of the bed to provide decreasing interstitial voidage volume along the normal direction of oil flow through the bed.

According to another preferred embodiment of the present invention, the catalytic hydrogenation activity is increased through the first fixed bed along the direction of feed flow through the bed by composing the bed of progressively more active hydrogenation catalyst compositions along the direction of feed flow to the first bed.

Preferably the catalyst used in the second fixed bed in the process of the present invention is a sulfactive catalyst which has predominantly a microporous pore structure. The term "micropore" is used in the present patent specification to connote pore sizes within the range of about 0 to 300 A. and usually between about 40 and 200 A. On the other hand, macropores are pores greater than 300 A. and, more usually, on the order of 500 A. in diameter. Predominantly microporous catalysts are preferred in the second fixed bed of the present process because the microporous catalysts have been found to have substantially higher catalytic activity for hydrodesulfurization of heavy oils compared to catalysts having lower surface areas and substantially or largely a macroporous pore structure. Particularly preferred catalysts for the second fixed bed are catalyst composites comprising discrete substantially insoluble metal phosphate particles surrounded by a continuous phase matrix comprising at least one solid oxide and at least one hydrogenating component selected from Group VI–B metals and compounds thereof, and Group VIII–B metals and compounds thereof.

Particularly preferred hydrogenating components for the second fixed bed catalyst are nickel, or compounds thereof, and tungsten, or compounds thereof. Other somewhat similar catalyst composites which are particularly preferred are described in more detail in Ser. No. 671,-994, now U.S. Pat. No. 3,493,517 filed Oct. 2, 1967, which patent specification is incorporated by reference into the present patent specification.

Preferred operating conditions for the second fixed catalyst bed include a temperature between about 500 and 900° F. and a pressure between about 200 and 3000 p.s.i.g.

The process of the present invention is carried out by contacting the heavy oil with catalyst in a first fixed catalyst bed which has tailored hydrogenation activity and then contacting at least a portion of the effluent from the first bed with catalyst in a second fixed catalyst bed. However, various steps may intervene between the first fixed catalyst bed and the second fixed catalyst bed and, although in certain instances it is preferred to carry out the operation using only one reactor vessel containing a seies of fixed catalyst beds, in most instances it is preferred to have the first fixed catalyst bed located in a reactor vessel separate from the reactor vessel containing the second fixed catalyst bed.

DETAILED DESCRIPTION

Figure 1:
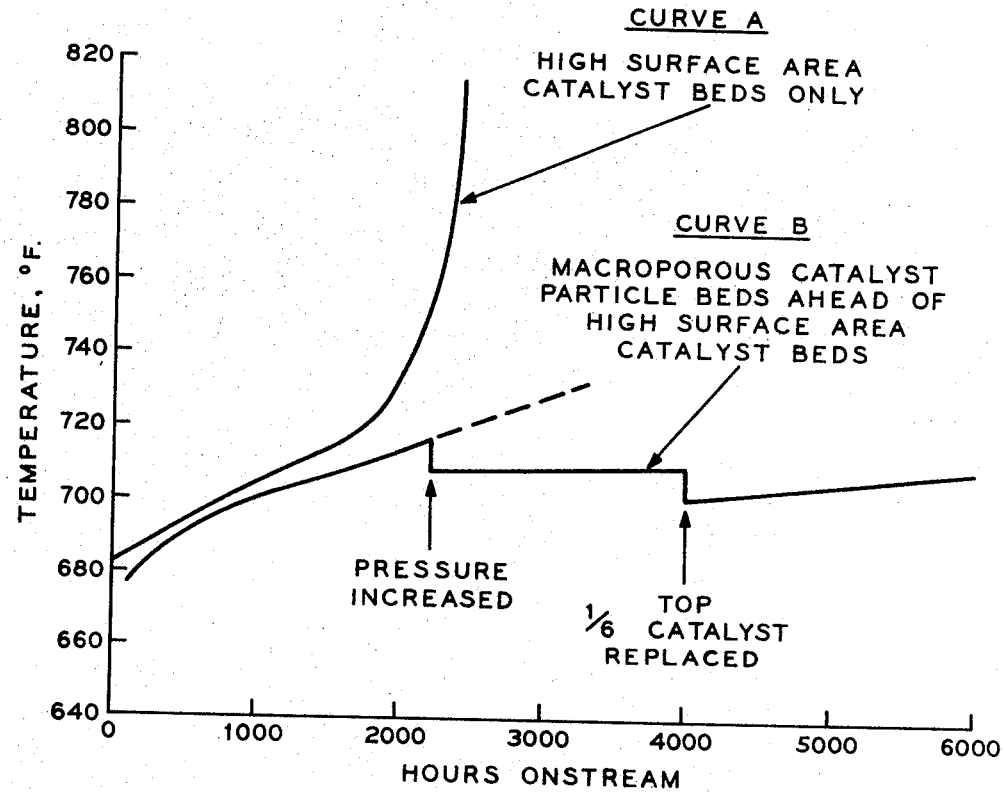
FIG. 1 is a graph showing the required temperature, as a function of time, to obtain a given amount of desulfurization of a residuum feed using one stage compared to using two catalytic stages.

The feed used in the runs plotted in FIG. 1 was an Arabian Light residuum having the following properties:

Sulfur: 3 weight percent
Boiling range: 650° F. to 1200° F.+
Metals content: Ni: 7 p.p.m.; V: 26 p.p.m.; Fe: 6 p.p.m.
Gravity: 17.3 ° API For all the test runs, six reactors were used in series. The total amount of catalyst contained in the serially connected reactors was 780 cu. cm. and the feed rate to the reactors was 780 cu. cm. of residuum per hour for a liquid hourly space velocity of 1.0. The hydrogen gas rate to the reactors was about 2000 standard cu. ft. per barrel of feed. The hydrodesulfurization operation was carried out on a constant basis of desulfurizing the residuum feed down to 1% product sulfur by weight with the temperature being raised, as necessary, to hold the product sulfur down to this level.

In the test run designated by Curve A in FIG. 1, all six reactors contained only high surface area catalyst. The catalyst composition was primarily molybdenum, titania, phosphate, and alumina. Preparation of this catalyst is described in Ser. No. 671,994, referred to earlier. The surface area of this catalyst was over 100 m.²/g. and specifically was in the range of about 200 to 400 m.²/g. As can be seen from Curve A in FIG. 1, the catalyst completely deactivated or fouled out after about 2000 hours of operation. As can be seen from Curve A, the temperature necessary to achieve desulfurization down to 1% product sulfur went from about 720° F. to above 800° F. in only a few hundred hours, starting from the 1800 hour point on Curve A. It is believed that metals fouled the surface of the catalyst so that the catalyst had relatively low activity for desulfurization after about 2000 hours of operation. The average pore size for the catalyst was about 85 A. and the catalyst contained very few macropores.

The data for Curve A was obtained at an operating pressure of about 1400 p.s.i.g. with the hydrogen partial pressure being about 1100 p.s.i.g. The catalyst size was 1/16 inch extrudate.

In a test run using the same feed and desulfurizing down to the same level, much better results were obtained using low surface area catalyst ahead of the same high surface area catalyst as was used in obtaining the data for Curve A. In this two-stage test run, which is illustrated graphically by Curve B in FIG. 1, the first two reactors contained nickel - molybdenum - silica - alumina catalyst prepared as described in USP 3,425,934, which patent is incorporated by reference into the present specification. This catalyst did not have a particularly low surface area, although the surface area was somewhat lower than that of the catalyst used in the second stage reactors. However, the nickel-molybdenum-silica-alumina catalyst used in the first stage reactors had a greater average pore diameter than that of the catalyst contained in the subsequent four reactors. Thus, the nickel-molybdenum-silica-alumina catalyst contained in the first two reactors had a greater metals capacity than the subsequent catalyst and was effective to prevent large quantities of metals from depositing out on the highly active desulfurization catalyst contained in the last four of the six serially connected reactors. As can be seen by Curve B in FIG. 1, a relatively long operating run was achieved by using the more porous nickel-molybdenum-silica-alumina catalyst ahead of the microporous highly active desulfurization catalyst. During the test run indicated by Curve B, the pressure was increased after about 2200 hours, but this pressure increase resulted in only a small improvement in catalyst activity. Also, it can be seen by the dotted extension of the first part of Curve B that a much longer length of operation can be achieved using the macroporous catalyst ahead of the highly active microporous catalyst, even without any pressure change during the run.

Figure 2:
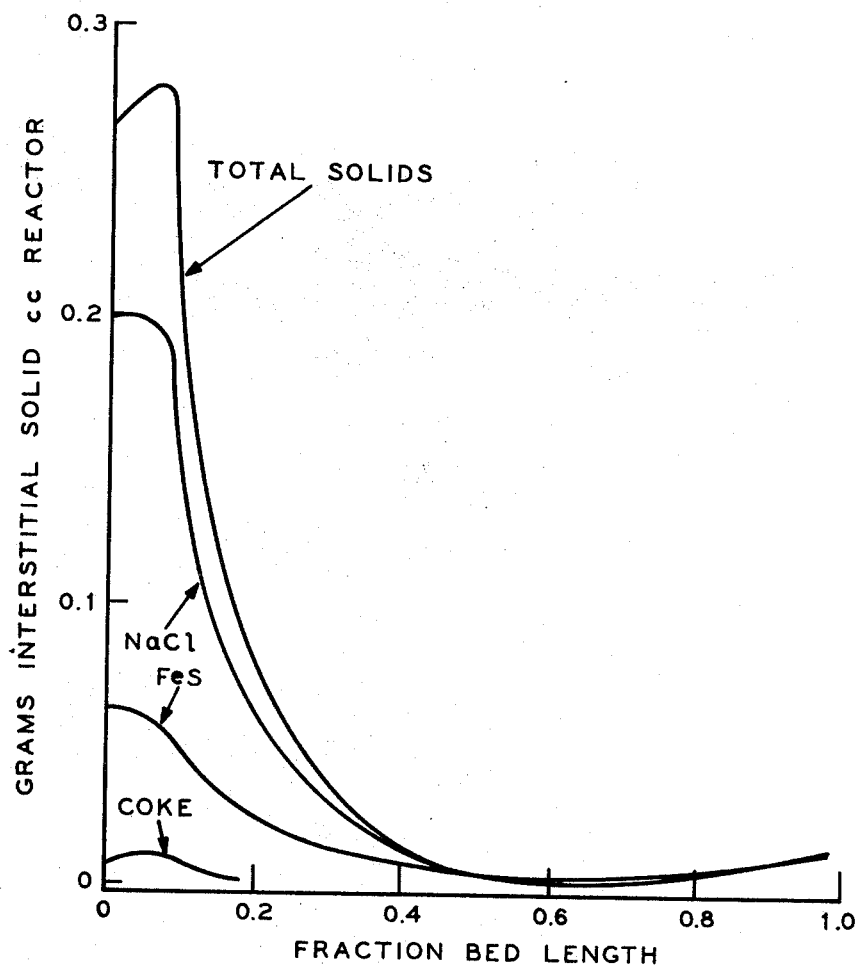
FIG. 2 is a metals plugging profile in a first-stage fixed catalyst bed after 4000 hours of operation.

However, after about 4000 hours of operation, plugging difficulties resulted in the first of the serially connected catalyst beds, particularly the very first of the two reactors containing the macroporous nickel-molybdenum-silica-alumina catalyst. The catalyst was removed from the first of the six reactors in series and the interstitial plug material located between the catalyst particles was analyzed for various segments of the catalyst bed. FIG. 2 graphically depicts the results of the analysis of the plugging material located between the particles in the first catalyst bed. As can be seen from FIG. 2, there was a very large amount of material on a relative basis at the uppermost part of the bed. In particular, there was a large amount of iron sulfide in between the catalyst particles in the first 20% of the catalyst bed in the first reactor. There also was a substantial amount of sodium chloride which had deposited out interstitially in the catalyst bed, but subsequent improved desalting techniques were developed to substantially reduce the problem due to sodium chloride. The iron sulfide plugging problem, however, could not be reduced by simple desalting techniques as most of the iron compounds were present in the feed as soluble organometallic compounds. The type of plug which thus was required to be reduced in order to obtain satisfactory lengths of operation for two-stage desulfurization, without incurring rapidly increasing pressure drop in the first catalyst bed, or beds, was substantially the same as the metals plug which is handled successfully by tailoring the catalyt bed so as to provide increasing hydrogenation catalytic activity along the normal direction of residuum flow through the bed as described in more detail in my application Ser. No. 743,568, now U.S. Pat. No. 3,496,099.

Although various specific embodiments of the invention have been described and shown, it is to be understood that they are meant to be illustrative only and not limiting. Certain features may be changed without departing from the spirit or essence of the invention. It is apparent that the present invention had broad application to the hydrodemetallization and hydrodesulfurization of hydrocarbons. Accordingly, the invention is not to be construed as limited to the specific embodiments illustrated but only as defined in the following claims.

I claim:

1. A process for hydrosulfurization of a heavy oil containing iron as an organometallic contaminant, which comprises:
   (a) passing the heavy oil at 400°–900° F., together with hydrogen, through a first fixed catalyst bed which has progressively more active hydrogenation catalyst compositions along the normal direction of feed flow through the first bed so as to spread out deposits of iron in the first fixed catalyst bed, and
   (b) passing at least a portion of the effluent from the first bed, at a temperature between 500° and 900° F. and a pressure between 200 and 3000 p.s.i.g., and in the presence of hydrogen, through a second fixed bed containing hydrodesulfurization catalyst particles having a surface area of at least 100 m.$^2$/g.

2. A process in accordance with claim 1 wherein the hydrodesulfurization catalyst particles contained in the second fixed bed have a predominantly microporous pore structure.

3. A process in accordance with claim 1 wherein the second fixed bed contains catalyst composites comprising discrete substantially insoluble metal phosphate particles surrounded by a continuous phase matrix comprising at least one solid oxide and at least one hydrogenating component selected from Group VI–B metals and compounds thereof, and Group VIII–B metals and compounds thereof.

4. A process in accordance with claim 3 wherein the hydrogenating component comprises nickel, or a compound thereof, and tungsten, or a compound thereof.

5. A process in accordance with claim 1 wherein the heavy oil is a residual oil selected from the group consisting of reduced crude, vacuum distillation residuum, solvent deasphalted reduced crude, solvent deasphalted vacuum residuum and mixtures thereof.

6. A process in accordance with claim 1 wherein the first catalyst bed is tailored with respect to both (a) interstitial void volume between the particles by varying the size or shape of the particles in the bed so as to provide decreasing interstitial voidage through the bed along the normal direction of feed flow, and (b) catalytic activity for effecting hydrogenation reactions so as to provide progressively more active hydrogenation catalyst compositions along the normal direction of feed flow so as to spread out deposits of iron in the first fixed catalyst bed.

7. A process in accordance with claim 1 wherein the hydrogenation catalytic activity is further increased through the first catalyst bed along the direction of feed flow through the bed by composing the bed of progressively smaller particle-sized catalyst along the direction of feed flow through the first fixed bed.

8. A process for hydrodesulfurization of a heavy oil contaminated with organometallic contaminants including organic iron compounds which comprises passing the heavy oil, together with the hydrogen, at a temperature between about 500 and 850° F. and a pressure between about 200 and 2000 p.s.i.g. through a first fixed catalyst bed which has progressively more active hydrogenation catalyst compositions along the normal direction of feed flow so as to spread out deposits of iron in the first fixed catalyst bed, and passing at least a portion of the effluent from the first bed at a temperature between about 500 and 900° F. and a pressure between about 200 and 3000 p.s.i.g. and in the presence of hydrogen through a second fixed bed containing hydrodesulfurization catalyst particles having a surface area of at least 100 m.$^2$/g. and having a predominantly microporous pore structure.

References Cited
UNITED STATES PATENTS

| | | | |
|---|---|---|---|
| 3,496,099 | 2/1970 | Bridge | 208—251 H |
| 3,425,810 | 2/1969 | Scott, Jr. | 208—210 |
| 3,546,103 | 12/1970 | Hamner et al. | 208—211 |
| 3,509,044 | 4/1970 | Adams et al. | 208—216 |
| 3,425,934 | 2/1969 | Jacobson et al. | 208—216 |
| 3,155,608 | 11/1964 | Hopper | 208—89 |
| 3,471,399 | 10/1969 | O'Hara | 208—216 |
| 3,544,452 | 12/1970 | Jaffe | 208—216 |

DELBERT E. GANTZ, Primary Examiner

G. J. CRASANAKIS, Assistant Examiner

U.S. Cl. X.R.

208—216